June 16, 1942.   R. A. SMITH   2,286,444
FLEXIBLE COUPLING
Filed Aug. 2, 1940
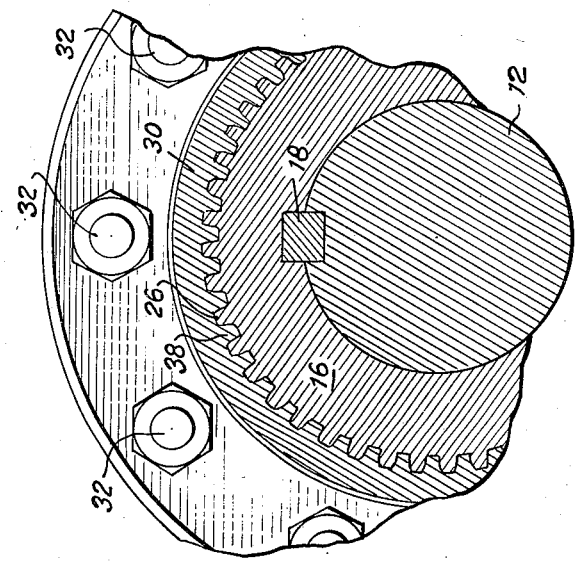
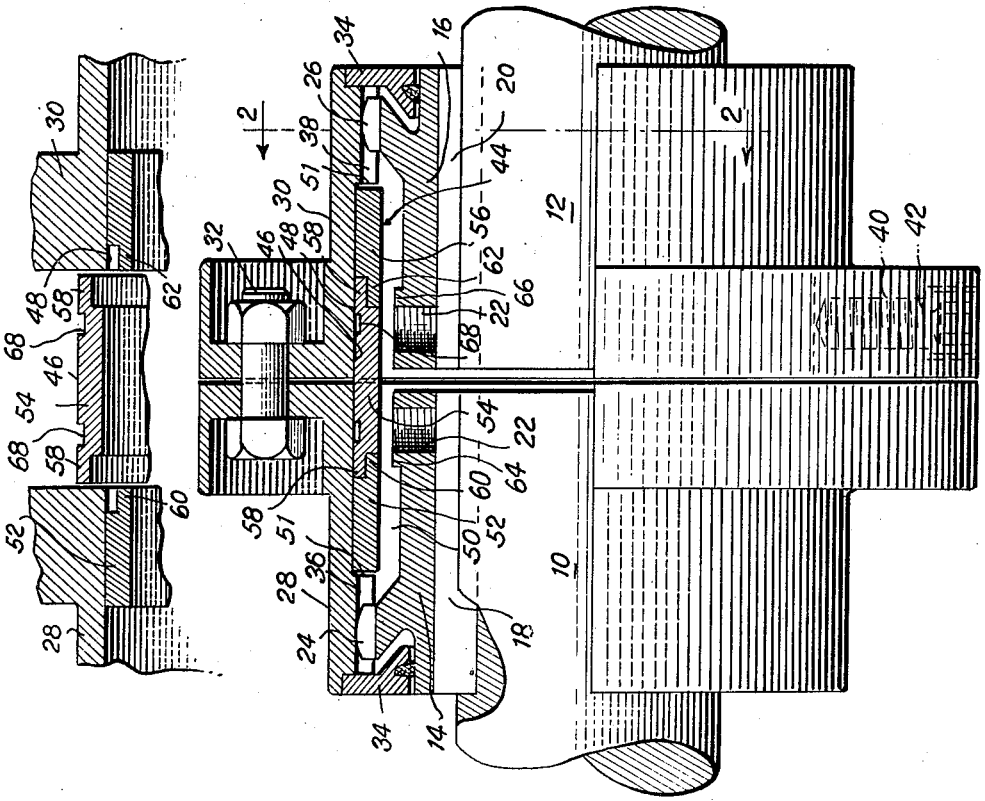
INVENTOR
Robert Armstrong Smith
BY
Brown & Jones
ATTORNEYS Patented June 16, 1942

2,286,444

UNITED STATES PATENT OFFICE 2,286,444

FLEXIBLE COUPLING

Robert Armstrong Smith, Mahwah, N. J.

Application August 2, 1940, Serial No. 349,889

4 Claims. (Cl. 64—9)

This invention relates to flexible couplings for shafts and more specifically to gear-type flexible couplings of the general class shown in and/or illustrated by United States Patent No. 2,201,799, issued to Serrell, et al., on May 21, 1940.

In general, the invention provides a device of the character described which will efficiently perform the purposes for which it is intended, which is simple and economical of construction, which can be expeditiously, conveniently and safely manipulated, and which can be readily manufactured and assembled.

The invention also provides means for centering the outer casing elements; provides means permitting the aligning of radially-inward coupling elements after radially-outward annular elements are in place without completely disassembling the coupling; and utilizes an oil-displacer ring for these purposes.

It may be at times desirable to provide an oil-displacer ring which is made up of a plurality of separable parts and/or to provide such a ring made up of parts of less than 360 degrees angular extent and/or to provide such a ring made up of a plurality of complete annuli, an interior one of which may or may not be interlocked with others thereof.

The invention accordingly comprises the features of construction, combination of elements and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawing, in which:

Figure 1 is a side view, partially in section, of a device embodying one form of the invention;

Fig. 2 is an end view, partially in section, of a part of the device shown in Fig. 1; and Fig. 3 is a detail view showing some of the parts of the device of Fig. 1 in their separated position.

The present invention contemplates a gear-type flexible coupling with means for aligning the outer casing thereof before and as that casing is finally bolted together. It is also within the inventive concept that these means shall permit an inspection of the alignment of the inner coupling elements without the necessity of entirely removing all, or any, of the outer parts of the coupling. Furthermore, these means, while the coupling is in operation transmitting power, displace the lubricant in the coupling and direct it to the gear surfaces which are in contact. The combination of these attributes and functions has been found to be of decided advantage in machines of this class.

In the drawing, 10 and 12 denote cylindrical shafts which are more or less coaxial and the ends of which approach each other. Torque is transmitted from either to the other through the coupling described below. Hub members 14 and 16 are removably and respectively mounted on the ends of said shafts and are secured thereto by securing means such as keys 18 and 20 each of which lies in a keyway in its shaft and a keyway in its hub member. Set screws 22 hold the keys in position. That end of hub member 14 which is distal with respect to the coupling is provided with an external gear 24, and hub member 16 similarly has external gear 26.

The cylindrical casing for carrying the internal gears which cooperate with the external gears on the hubs may consist of two sections 28 and 30 fastened together suitably, as by bolts 32. The distal end of each section of the casing is provided with an annular closure element 34 which may project in or into a recess in the distal end of the respective hub member and which may be welded or otherwise inseparably connected to the casing members.

The outer or distal end of casing sections 28 and 30 are provided, respectively, with internal gears 36 and 38 which surround and mesh respectively with external gears 24 and 26.

In order that the external and internal gears at each end of the coupling may be lubricated during rotation, fluid lubricant is inserted through passageway 40 normally closed by screw 42. When the coupling is at rest, the fluid settles to a space beneath and radially outward of the hubs and radially inward of the casing sections, referred to hereinafter as the stationary lubricant space. The greater portion of the lubricant is directed, when the coupling rotates, into the spaces between and around the cooperating teeth of the external and internal gears by means of a lubricant deflector or lubricant displacer ring 44.

For one reason or another there is usually required to be a small axial clearance for movement of one of the sets of gear teeth with respect to the other. With this in mind, one of the sets of teeth is made axially longer than the other by an amount which is short compared to the axial length of the teeth. As shown, the internal teeth 36 and 38 are somewhat longer axially than the external teeth 24 and 26 (and for the sake of clearness are shown exaggeratedly elongated).

Ring 44 has an outer cylindrical surface 46 which aligns, or at least assists in aligning, the casing sections which each has an inner cylindrical surface 48 of substantially the same radius as surface 46. The greater part of the stationary lubricant space 50 is between the inner surface of ring 44 and the outer surfaces of the hubs. When the coupling is stationary and the lubricant drains into space 50 and/or including the adjacent regions around the teeth of the external and internal gears, there is enough lubricant stored amply to submerge the gears when the coupling rotates and the lubricant within the casing is thrown by centrifugal action outwardly and around the teeth.

The inner edges of the internal teeth terminate at the positions indicated at 51 and the length of the ring is such that it takes up substantially the whole of the distance from shoulder 51 on casing section 28 to shoulder 51 on casing section 30 and thereby insures that the external gears do not come closer together axially than that even when the inner hub ends are quite far apart. As a result of this arrangement, the internal gear teeth may be cut without interfering with the adjacent portions of the casing sections 28 and 30. The ends of the casing may be provided with the inseparable covers 34 and the stationary lubricant space 50 within the casing is such that sufficient lubricant is contained therein to supply the necessary amount for the lubrication of the cooperating gear teeth because practically all of it is directed to the meshing gear teeth when rotating. It is to be noted that substantially all the lubricant is enabled to be used on the teeth, making a smaller and less expensive coupling possible, yet, when the coupling is to be taken apart, the removal of the sections of the lubricant displacer ring permits the hubs 14 and 16 to be slid off the ends of the shafts without requiring the closure members to be removed from the casing sections 28 and 30.

The ring 44 is made up of a plurality of annuli which are coaxial and placed side by side. In the form shown in the drawing, there are three annuli, 52, 54 and 56. There may be any number of annuli more than three. These mutual boundaries may be at a distance from a plane perpendicular to the axis of the coupling at its mid-point whereby an annulus 54 has an outer surface against which may be positioned the inner surface 48 of each of the casing elements 28 and 30.

The annuli 52, 54 and 56 may be interlocked in any desired fashion. Annulus 54 may have axial flanges 58 which are superposed radially on flanges 60 and 62 of annuli 52 and 56, respectively.

In a preferred form, one or more of the displacer ring annuli are separable into a plurality of parts each of angular extent less than 360 degrees. They may be placed end to end, which term is intended to include not only ends abutting flatly against each other but also other types of contact such as overlapping or interlocking. It is, on occasion, advantageous to determine that certain surfaces of the hubs 14 and 16 are aligned—and to do so without entirely removing the other parts of the coupling. This may be done with the present construction by unbolting the casing elements 28 and 30, separating them axially and separating the parts of the annulus 54 radially to expose the radially outward surfaces 64 and 66 of hubs 14 and 16, respectively, as shown in Fig. 3. An instrument may then be inserted to determine the alignment of hubs and their surfaces.

Depressions 68 may be provided on the outer surface of the displacer ring to receive lubricant from passageway 40 and transmit it toward the inter-annular surfaces where it may flow through into the stationary space 50.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A gear-type flexible coupling comprising a pair of endwise juxtaposed casing elements, an annulus axially separable into three parts, one of said parts at least assisting in positioning radially another of said parts, said other part being positioned against and for assisting in centering said casing elements, and extending across the mutual boundary of said casing elements.

2. A gear-type flexible coupling comprising a pair of endwise juxtaposed casing elements, an annulus axially separable into a multiplicity of parts, one of said parts being positioned radially by others of said parts and having an exterior surface in contact with the interior surfaces of said casing elements.

3. A gear-type flexible coupling comprising a pair of endwise juxtaposed casing elements, an annulus radially separable into two arcuate parts and coaxial with said coupling and positioned to assist in centering said casing elements.

4. In a gear-type flexible coupling, an oil-displacer ring comprising at least three coaxial annular juxtaposed elements, at least one of said elements being radially positioned by another of said elements.

ROBERT ARMSTRONG SMITH.